June 23, 1936.  F. L. CONE  2,045,070
STOCK FEEDING MECHANISM
Filed Aug. 16, 1933   2 Sheets-Sheet 1
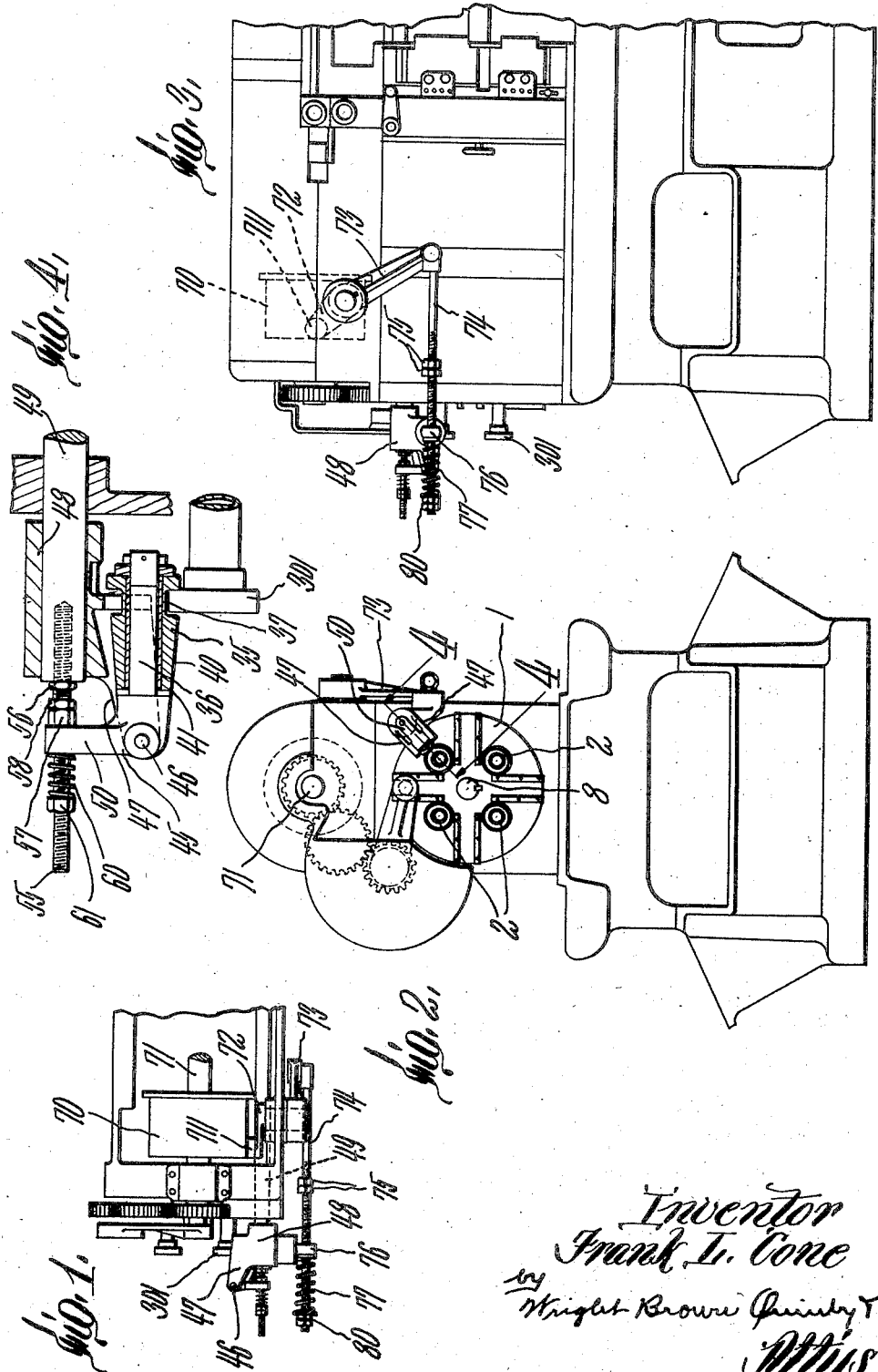
Inventor
Frank L. Cone
by Wright, Brown, Quinby & May
Attys

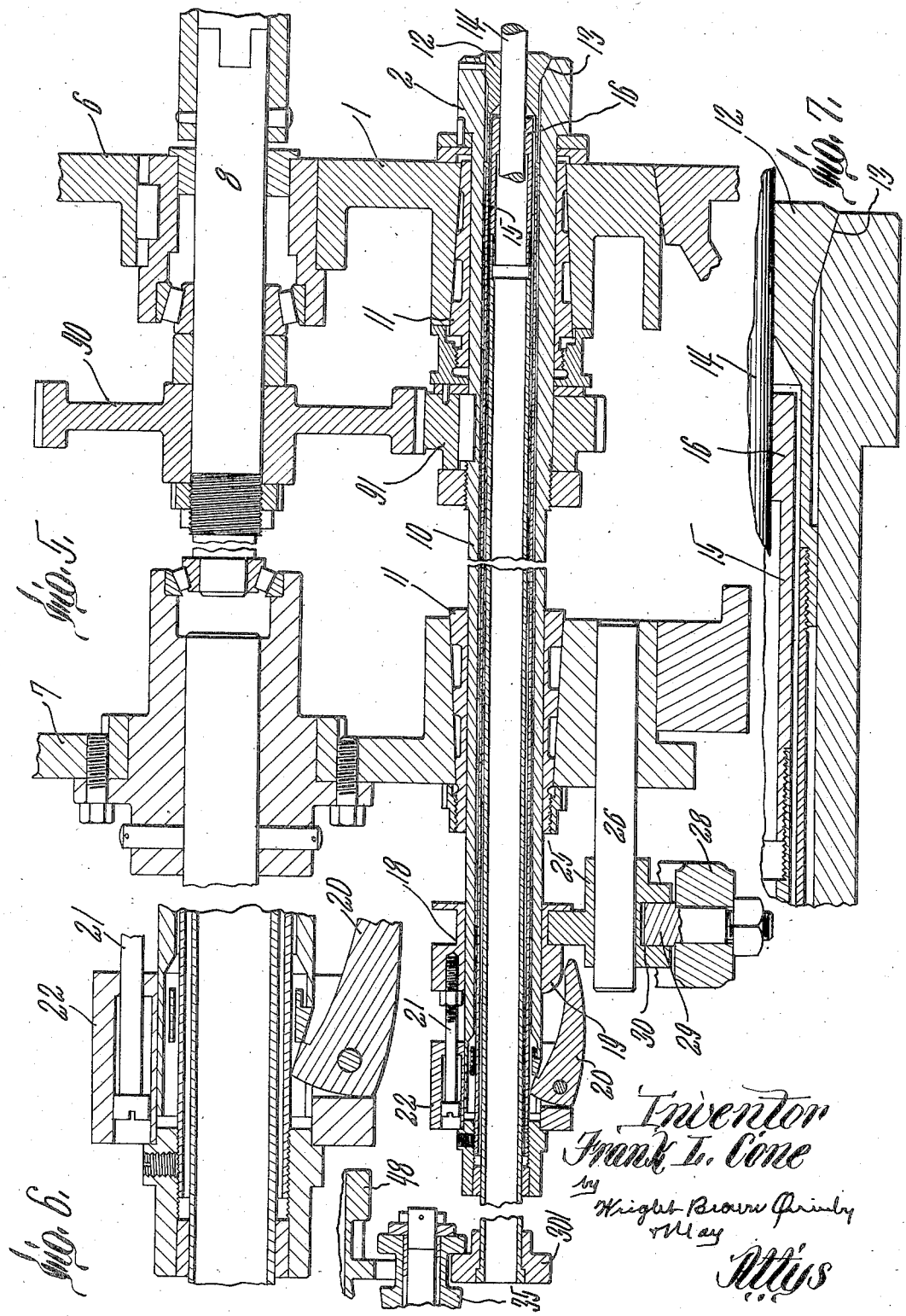

Patented June 23, 1936

2,045,070

UNITED STATES PATENT OFFICE 2,045,070

STOCK FEEDING MECHANISM

Frank L. Cone, Windsor, Vt.

Application August 16, 1933, Serial No. 685,385

11 Claims. (Cl. 29—62)

This invention relates to mechanism for feeding bar stock, as in an automatic lathe, and more particularly when it is desired that the stock be rotated, and has for an object to provide improved mechanism for actuating a stock feeder to reduce wear on the parts and to produce a smoother actuation thereof, and to provide a device which is well adapted for use in connection with a plurality of work spindles of a multi-spindle machine.

For a more complete understanding of this invention, reference may be had to the accompanying drawings in which Figure 1 is a fragmentary top plan of a multi-spindle automatic lathe embodying the subject matter of this invention.

Figure 2 is a headstock end elevation of the same.

Figure 3 is a fragmentary front elevation.

Figure 4 is a fragmentary section to a larger scale on line 4—4 of Figure 2.

Figure 5 is a fragmentary section through the turret showing one of the work spindles.

Figures 6 and 7 are views similar to portions of Figure 5 but drawn to a larger scale.

Referring to the drawings, at 1 is indicated a drum or turret of a multi-spindle automatic lathe having arranged therein in circular series about the axis of rotation of this turret a plurality of rotary work holders indicated generally at 2. In Figure 5 the turret is shown as having a pair of end plates 6 and 7 mounted for rotation about the axis of a shaft 8. Each of the work spindles 2 is shown as comprising a hollow spindle 10 journaled for rotation in suitable bearings 11 in the turret end plates 6 and 7 and having positioned therein a collet sleeve 12 cooperating with the tapered face 13 on the spindle serving as a collet hood (see Figure 7) to effect clamping and releasing of the work, shown as bar stock at 14, on axial motion of the collet sleeve 12. Within the collet sleeve 12 is positioned a feed sleeve 15 which is provided with any suitable form of stock pusher indicated at 16 so that by withdrawal to the left, as shown in Figure 5, of this stock pusher while the stock is being held by the collet, and then moving the stock pusher to the right while the stock is freed from the collet, the stock is moved step by step to feed it to any suitable tool (not shown) as is well understood in the art. The collet mechanism may be of any suitable type but as shown the collet is actuated by axial motion of a collar 18 slidable on the spindle at the left side of the turret wall 7 and having a cam portion 19 acting on arms 20 forcing them outwardly to cause the collet to grip the work and having a lost motion connection as through bolts 21 with a sleeve 22 on which the arms 20 are pivotally mounted to free the collet from the work on motion of the collar 18 to the right to a sufficient extent. As shown the motion of the sleeve 18 is produced through reciprocation of an actuating member 25 mounted to slide on a rod 26 secured in the turret wall 7. A suitable actuating member 28, which may be cam-controlled, and provided with a shoe 29 which may engage in a groove 30 in one of the blocks 25, these blocks being successively brought into proper relation as the turret is indexed, may be employed for causing gripping and releasing of the work in proper timed relation to the operation of the machine, as is well known. This stock gripping and releasing mechanism forms the subject matter of my application for patent Serial No. 641,731, filed November 8, 1932, for Work holding and feeding mechanisms.

Each of the stock pushers with its feed sleeve 15 is extended beyond the rear end portion of the spindle and is shown as provided with a circular head 301 at its outer end. As the turret is indexed from one to a succeeding angular position, the heads of the feeders are successively brought into cooperative relation to feeder actuating mechanism. This mechanism, as shown best in Figure 4, comprises an element 35 which is shown as journaled for free rotation on a shaft 36 and which is also shown as provided with a peripheral groove 37 within which the head 301 of one of the stock feeders engages when the work spindle carrying it is in one of its indexed positions. This element 35 is shown as provided with a frustro-conical periphery 40 presenting a tapered face with its small end 41 arranged remote from the peripheral groove 37. The shaft 36 on which the element 35 is journaled is yieldable laterally of the direction of feed motion of the stock feeder, which direction of motion is parallel with the axis of rotation of the turret. As shown this yielding motion is provided for by forming the shaft 36 as one arm of a bell crank lever 45, this lever being fulcrumed at 46 between a pair of jaws 47 integral with a block 48. This block, as shown, is carried by a bar 49 mounted for reciprocation in the machine frame substantially parallel to the axis of rotation of the turret and the axes of the rotary work holders or spindles 2. The bar 49 and its mounting determine the path of reciprocating motion of the block 48 and the parts carried thereby, this block being moved, however, by mechanism later described. The lever 45, as shown, is provided with an arm 50 extending transversely to this axis and it is shown as perforated adjacent to its outer end for the free passage therethrough of a stud 55. This stud is threaded into the outer end of the bar 49 and may be secured in position therein by a lock nut 56. On this stud is positioned a stop nut 57 which may be provided with a check nut 58 against which the arm 50 engages when the element 35 is in the position shown in Figure 4 in operative relation to one of the heads 37 of a stock feeder and it may be yieldingly held in this position by means of a spring 69 reacting between the arm 50 and a nut 61 threaded onto the outer end portion of the stud 55. By reason of this mounting it is possible for the operator to grasp the arm 50 and pull it away from contact with the stop 57, swinging the element 35 away from the head 30, so that by grasping the head 30 the stock feeder may be pulled out from the work spindle. This withdrawing action of the stock feeder is necessary where the size of stock is to be changed, it being necessary to provide a separate stock pusher for each size of stock employed. By turning the nuts 57 and 58 a manual adjustment may be effected which may even be caused to move the lever 45 out of operative position when desired. This mounting of the element 35, however, permits the ready return of the stock pusher to operative position since by pushing the stock pusher to the right, its head 37 engages the tapered periphery 40 of the element 35 and as the pressure on the stock pusher continues, it causes this element 35 to retract as a latch, until the head 301 comes opposite to the groove 37, whereupon the element 35 snaps back automatically through the action of the spring 60 with the head 30 within the groove 37. Thereupon by actuation of the block 48, this actuation comprising its reciprocation in the direction of the axis of the bar 49, the particular stock feeder which is in operative relation to the element 35 at any one time may be actuated. As shown this motion of the block 48 is produced from a suitable cam (not shown) on the cam drum 70 carried by the cam shaft 71. Suitable cams on this drum act on a follower 711 on a rock arm 72, this rock arm also having fixed thereto an arm 73 which is connected through an adjustable link 74 with the block 48. As shown, this link 74 is threaded and carries thereon adjustable stop and lock nuts 75 which may impinge on a portion 76 through which the link 74 passes and connected to or forming a part of a block 48. The outer end of the link 74 is shown as carrying a spring 77 which reacts between one face of the portion 76 and the stop and check nuts 80 on the outer end of the link 74. This spring 77 provides a yielding action in feed direction of the block 45 so that the work may be fed up against a stop, as is well understood in the art, to be positively stopped at the correct fed length, while the retracting motion of the stock feeder may be produced positively by motion of the link 74 after the nuts 75 have impinged on the portion 76.

In machines of this kind it is commonly desired to rotate the stock and for this reason, in Figure 5 the shaft 8 is shown as provided with a driving gear 90 meshing with pinions 91, there being one pinion for each of the work spindles. As the work spindles are rotated the stock feeders are also rotated so that the head 301 in cooperative relation to the element 35 at any one time is also rotated. By mounting the element 35 so that it is freely rotatable, wear of the cooperating parts is materially reduced.

From the foregoing description of an embodiment of this invention, it should be evident to those skilled in the art that various changes and modifications might be made without departing from the spirit or scope of this invention as defined by the appended claims.

I claim:

1. In combination with a rotary work holder for bar stock, a rotary stock-engaging device having an actuating part movable axially of said holder, said part having a circular head, a member freely rotatable about an axis substantially parallel to the axis of said holder and movable substantially laterally of said axis into and out of operative engagement with said part and having a peripheral groove to receive said head, an element on which said member is journaled, means acting on said element to yieldingly hold said member in operative lateral position, and means for moving said element to move said member axially of said holder to operate said device.

2. In combination with a rotary work holder for bar stock, a rotary stock-engaging device having an actuating part movable axially of said holder, a lever, a member freely rotatable on said lever and movable by swinging of said lever into and out of operative relation to said part, yielding means for holding said lever in operative angular position, and means for moving said lever substantially axially of said holder to actuate said device.

3. In combination, a rotary work holder, a stock feeder rotatable with said holder and movable axially thereof to feed the stock, a member movable substantially parallel to said work holder axis, a lever fulcrumed on said member and having an arm normally in operative engagement with said feeder, means for moving said member, and means manually operable to move said lever out of operative angular position.

4. In combination with a rotary work holder for bar stock, and a rotary and reciprocating stock feeder for said holder, of a bar reciprocable substantially parallel to said feeder, a freely rotatable member, operative connections between said member and bar for effecting reciprocation of said member by reciprocation of said bar, said feeder and member having cooperative parts comprising a head on one of said parts and a peripheral groove in which said head may engage in the other of said parts, and means for reciprocating said bar to thereby reciprocate said stock feeder.

5. In combination with a rotary work holder for bar stock, and a rotary stock feeder for said holder having a circular head, of a bar reciprocable substantially parallel to said feeder, a freely rotatable member having a peripheral groove in which said head may engage, operative connections between said member and bar for effecting reciprocation of said head and thereby actuating said feeder by reciprocation of said bar, and means for reciprocating said bar.

6. In combination with a rotary work holder for bar stock, and a rotary and axially movable stock feeder for said holder having a circular head, of a member reciprocable substantially parallel to said feeder, a bell crank lever fulcrumed on said feeder, an element journaled for free rotation on one arm of said lever and having a peripheral groove in which said head may engage, spring means supported by said member and engageable with the other arm of said lever for yieldingly holding said element in operative relation to said head, and means for reciprocating said member.

7. In combination with a rotary work holder for bar stock, and a rotatable and axially movable stock feeder for said holder having a circular head, of a member reciprocable substantially parallel to said feeder, an element carried by said member and yieldable transversely thereof and journaled for rotation on an axis substantially parallel to the direction of motion of said member, said element having a peripheral groove within which said head normally extends, and means for reciprocating said member.

8. In combination with a rotary work holder for bar stock, and a rotary and axially movable stock feeder for said work holder having a circular head, of a member reciprocable substantially parallel to said feeder, a rotatable element carried by said member and having a peripheral groove into which said head may engage, and means supporting said element from said member for yielding motion to permit disengagement of said element from said head, said element having a tapered periphery with which said head may engage whereby said head may be moved axially when out of said groove to retract said element until said head is opposite to said groove, whereupon said element automatically moves into operative relation to said head with said head in said groove.

9. In combination with a rotary work holder for bar stock, and a rotary and axially movable stock feeder for said holder having a circular head, of a member mounted for reciprocation substantially parallel to the axis of said feeder, a bell crank lever fulcrumed on said member and having one arm extended substantially parallel to said axis and the other arm transverse thereto, an element journaled axially on said one arm and having a peripheral groove within which said head is normally positioned, a stop with which the other arm of said bell crank lever engages when said element is in position for said head to engage in said groove, and a spring yieldingly holding said other arm against said stop yieldable to permit axial withdrawal of said head from said groove on rocking of said lever, said element being tapered with its smaller diameter portion remote from said groove.

10. In combination with a rotatable turret, a plurality of work holders arranged in circular series in said turret about the axis of rotation thereof, and a rotary and axially movable stock feeder for each work holder, of a member freely rotatable about an axis substantially parallel to the axes of said stock feeders into cooperative relation to which each feeder passes as said turret is successively indexed, said feeders and members having complementally shaped portions, one of said portions comprising a head and the other of said portions comprising a groove to receive said head, said member being movable to actuate said feeders and being rockable on a fulcrum transverse to its rotational axis away from cooperative relation to the feeder adjacent thereto at any time.

11. In combination with a turret, a plurality of rotary work holders arranged in circular series within said turret about the axis of rotation thereof, and a rotary and axially movable stock feeder for each work holder, each of said feeders having a circular head, of a member mounted for reciprocation parallel to said axis, a bell crank lever fulcrumed on said member and having one arm extended substantially parallel to said axis and the other transverse thereto, an element journaled axially on said one arm and having a peripheral groove in which the heads of said feeders may successively engage as said turret is turned between successive indexed angular positions, a stop with which said other arm engages when said bell crank lever is in angular position for the groove in said element to receive said heads as said turret is indexed, a spring yieldingly holding said other arm against said stop, said element being tapered with its smaller diameter portion remote from said groove whereby a feeder in proper indexed position of said turret may be moved axially to bring its head into said groove riding on said tapered portion and retracting said element until said head is positioned opposite to said groove, and means for reciprocating said member.

FRANK L. CONE.